US012063277B2

(12) United States Patent
Lazauskas et al.

(10) Patent No.: US 12,063,277 B2
(45) Date of Patent: *Aug. 13, 2024

(54) OPTIMIZED SERVER PICKING IN A VIRTUAL PRIVATE NETWORK (71) Applicant: Netflow, UAB, Vilnius (LT)

(72) Inventors: Vaidas Lazauskas, Vilnius (LT); Karolis Kaciulis, Vilnius (LT)

(73) Assignee: Netflow, UAB, Vilnius (LT)

( * ) Notice: Subject to any disclaimer, the term of this patent is extended or adjusted under 35 U.S.C. 154(b) by 141 days.

This patent is subject to a terminal disclaimer.

(21) Appl. No.: 17/864,359

(22) Filed: Jul. 13, 2022

(65) Prior Publication Data

US 2023/0067990 A1    Mar. 2, 2023

Related U.S. Application Data (63) Continuation of application No. 17/464,394, filed on Sep. 1, 2021, now Pat. No. 11,418,489.

(51) Int. Cl.
*H04L 9/40*         (2022.01)
*G06F 9/50*         (2006.01)
*H04L 12/46*        (2006.01)
*H04L 67/1008*      (2022.01)
*H04L 67/1021*      (2022.01)
(Continued)

(52) U.S. Cl.
CPC .......... *H04L 67/141* (2013.01); *G06F 9/5055* (2013.01); *H04L 12/4641* (2013.01); *H04L 63/0272* (2013.01); *H04L 63/102* (2013.01); *H04L 67/1008* (2013.01);
(Continued)

(58) Field of Classification Search
CPC .............. H04L 67/141; H04L 67/1008; H04L 67/1021; H04L 67/1044; H04L 67/306; H04L 67/51; H04L 12/4641; H04L 63/0272; H04L 63/102; G06F 9/5055
See application file for complete search history.

(56) References Cited

U.S. PATENT DOCUMENTS 9,713,175 B2    7/2017   Jones et al.
10,374,953 B1   8/2019   Branch et al.
(Continued)

FOREIGN PATENT DOCUMENTS

CN    100479478 C    12/2004
CN    108243079 A    7/2018
(Continued)

*Primary Examiner* — Alina A Boutah
(74) *Attorney, Agent, or Firm* — The Pattani Law Group (57) ABSTRACT A method including transmitting, by a user device to an infrastructure device prior to establishing a virtual private network (VPN) connection with a VPN server, service information indicating one or more VPN services to be received by the user device after establishing the VPN connection with the VPN server; receiving, by the user device from the infrastructure device, information associated with the VPN server that is selected by the infrastructure device to provide the one or more VPN services to the user device based at least in part on the service information; and establishing, by the user device based at least in part on utilizing the information associated with the VPN server, the VPN connection with the VPN server to receive the one or more VPN services is disclosed. Various other aspects are contemplated.

20 Claims, 6 Drawing Sheets (51) Int. Cl.
    *H04L 67/104*    (2022.01)
    *H04L 67/141*    (2022.01)
    *H04L 67/306*    (2022.01)
(52) U.S. Cl.
    CPC ...... *H04L 67/1021* (2013.01); *H04L 67/1044* (2013.01); *H04L 67/306* (2013.01)

(56)                References Cited

U.S. PATENT DOCUMENTS

| | | | |
|---|---|---|---|
| 10,601,779 | B1  | 3/2020  | Matthews et al. |
| 11,190,491 | B1  | 11/2021 | Kaciulis et al. |
| 11,245,670 | B1  | 2/2022  | Celiesius et al. |
| 11,310,146 | B1* | 4/2022  | Kaciulis ............ H04L 63/0428 |
| 11,336,516 | B1* | 5/2022  | Birgiolas ........... H04L 63/0272 |
| 11,368,335 | B1* | 6/2022  | Celiesius .......... H04L 12/4641 |
| 2007/0299954 | A1 | 12/2007 | Fatula |
| 2008/0046995 | A1 | 2/2008  | Satterlee et al. |
| 2013/0204971 | A1 | 8/2013  | Brandwine et al. |
| 2013/0205025 | A1 | 8/2013  | Shamsee et al. |
| 2014/0258819 | A1 | 9/2014  | Chen et al. |
| 2017/0099159 | A1 | 4/2017  | Abraham |
| 2017/0302629 | A1 | 10/2017 | El-Moussa et al. |
| 2018/0013769 | A1 | 1/2018  | Robinson et al. |
| 2018/0020324 | A1 | 1/2018  | Beauford |
| 2019/0081930 | A1 | 3/2019  | Hunt, IV |
| 2021/0029172 | A1 | 1/2021  | Chen |

FOREIGN PATENT DOCUMENTS

| | | | |
|---|---|---|---|
| CN | 109617780 | A | 1/2019 |
| CN | 110838967 | A | 11/2019 |

\* cited by examiner

OPTIMIZED SERVER PICKING IN A VIRTUAL PRIVATE NETWORK

CROSS REFERENCE

This application is a continuation of U.S. Non-Provisional patent application Ser. No. 17/464,394, filed on Sep. 1, 2021, and titled "Optimized Server Picking in a Virtual Private Network," the entire contents of which are incorporated herein by reference.

FIELD OF DISCLOSURE

Aspects of the present disclosure generally relate to a virtual private network (VPN), and more particularly to optimized server picking in a VPN.

BACKGROUND

Global Internet users increasingly rely on VPN services to preserve their privacy, to circumvent censorship, and/or to access geo-filtered content. Originally developed as a technology to privately send and receive data across public networks, VPNs are now used broadly as a privacy-preserving technology that allows Internet users to obscure not only the communicated data but also personal information such as, for example, web browsing history from third parties including Internet service providers (ISPs), Spywares, or the like. A VPN service provider may offer a secure private networking environment within a publicly shared, insecure infrastructure through encapsulation and encryption of the data communicated between a VPN client application (or VPN application) installed on a user device and a remote VPN server.

Most VPN providers rely on a tunneling protocol to create the secure private networking environment, which adds a layer of security to protect each IP packet of the communicated data during communication over the Internet. Tunneling may be associated with enclosing an entire IP packet within an outer IP packet to form an encapsulated IP packet, and transporting the enclosed IP packet over the Internet. The outer IP packet may protect contents of the enclosed IP packet from public view by ensuring that the enclosed IP packet is transmitted over the Internet within a virtual tunnel. Such a virtual tunnel may be a point-to-point tunnel established between the user device and the VPN server. The process of enclosing the entire IP packet within the outer IP packet may be referred to as encapsulation. Computers, servers, or other network devices at ends of the virtual tunnel may be referred to as tunnel interfaces and may be capable of encapsulating outgoing IP packets and of unwrapping incoming encapsulated IP packets.

Encryption may be associated with changing the data from being in a transparently readable format to being in an encoded, unreadable format with the help of an encryption algorithm. Decryption may be associated with changing the data from being in the encoded, unreadable format to being in the transparently readable format with the help of a decryption algorithm. In an example, encoded/encrypted data may be decoded/decrypted with only a correct decryption key. In a VPN, encryption may render the communicated data unreadable or indecipherable to any third party. At a basic level, when the user launches the installed VPN application and connects to the VPN server, the VPN application may encrypt all contents of the data before transmission over the Internet to the VPN server. Upon receipt, the VPN server may decrypt the encrypted data and forward the decrypted data to an intended target via the Internet. Similarly, the VPN server may encrypt all contents of the data before transmission over the Internet to the user device. Upon receipt, the VPN application on the user device may decrypt the encrypted data and provide the decrypted data to the user.

VPNs generally use different types of encryption and decryption algorithms to encrypt and decrypt the communicated data. Symmetric encryption may utilize encryption and decryption algorithms that rely on a single private key for encryption and decryption of data. Symmetric encryption is considered to be relatively speedy. One example of an encryption and decryption algorithm utilized by symmetric encryption may be an AES encryption cipher. Asymmetric encryption, on the other hand, may utilize encryption and decryption algorithms that rely on two separate but mathematically-related keys for encryption and decryption of data. In one example, data encrypted using a public key may be decrypted using a separate but mathematically-related private key. The public key may be publicly available through a directory, while the private key may remain confidential and accessible by only an owner of the private key. Asymmetric encryption may also be referred to as public key cryptography. One example of an encryption and decryption algorithm utilized by asymmetric encryption may be Rivest-Shamir-Adleman (RSA) protocol.

In a VPN, keys for encryption and decryption may be randomly generated strings of bits. Each key may be generated to be unique. A length of an encryption key may be given by a number of the randomly generated string bits, and the longer the length of the encryption key, the stronger the encryption is.

VPNs may employ user authentication, which may involve verification of credentials required to confirm authenticity/identity of the user. For instance, when a user launches the VPN application to request a VPN connection, the VPN service provider may authenticate the user device prior to providing the user device with access to VPN services. In this way, user authentication may provide a form of access control. Typically, user authentication may include verification of a unique combination of a user ID and password. To provide improved security in the VPN, user authentication may include additional factors such as knowledge, possession, inheritance, or the like. Knowledge factors may include items (e.g., pin numbers) that an authentic user may be expected to know. Possession factors may include items (e.g., one-time password (OTP) tokens) that an authentic user may be expected to possess at a time associated with the authentication. Inherent factors may include biometric items (e.g., fingerprint scans, retina scans, iris scans, or the like) that may be inherent traits of an authentic user.

A VPN may be associated with a network of VPN servers, typically deployed in various geographic locations. A VPN server may be a physical server or a virtual server configured to host and/or globally deliver VPN services to the user. A server may be a combination of hardware and software, and may include logical and physical communication ports. When launched, the VPN application may connect with a selected VPN server for secure communication of data via the virtual tunnel.

The VPN application, installed on the user device, may utilize software-based technology to establish a secure connection between the user device and a VPN server. Some VPN applications may automatically work in the background on the user device while other VPN applications may include front-end interfaces to allow the user to interact with and configure the VPN applications. VPN applications may often be installed on a computer (e.g., user device), though some entities may provide a purpose-built VPN application as a hardware device that is pre-installed with software to enable the VPN. Typically, a VPN application may utilize one or more VPN protocols to encrypt and decrypt the communicated data. Some commonly used VPN protocols may include OpenVPN, SSTP, PPTP, L2TP/IPsec, SSL/TLS, Wireguard, IKEv2, and SoftEther.

SUMMARY

In one aspect, the present disclosure contemplates a method for optimized server picking in a virtual private network (VPN), the method comprising receiving, from a user device, service information indicating one or more VPN services to be received during an established VPN connection; determining, based at least in part on the service information, a given VPN server from among a plurality of VPN servers to provide the one or more VPN services to the user device; and transmitting, to the user device, information associated with the given VPN server to enable the user device to receive the one or more VPN services.

In another aspect, the present disclosure contemplates a device associated with a VPN, the device comprising a memory; and a processor communicatively coupled to the memory, the processor being configured to: receive, from a user device, service information indicating one or more VPN services to be received during an established VPN connection; determine, based at least in part on the service information, a given VPN server from among a plurality of VPN servers to provide the one or more VPN services to the user device; and transmit, to the user device, information associated with the given VPN server to enable the user device to receive the one or more VPN services.

In another aspect, the present disclosure contemplates a non-transitory computer readable medium storing instructions, which when executed by a processor cause the processor to: receive, from a user device, service information indicating one or more VPN services to be received during an established VPN connection; determine, based at least in part on the service information, a given VPN server from among a plurality of VPN servers to provide the one or more VPN services to the user device; and transmit, to the user device, information associated with the given VPN server to enable the user device to receive the one or more VPN services.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

The present disclosure is related to optimized server picking. In some aspects, server picking may be associated with determining a VPN server, from among a plurality of VPN servers, as an optimal VPN server for providing VPN services to a user device. In some aspects, determining a VPN server as the optimal VPN server may include factoring preferences of a user device.

Figure 1:
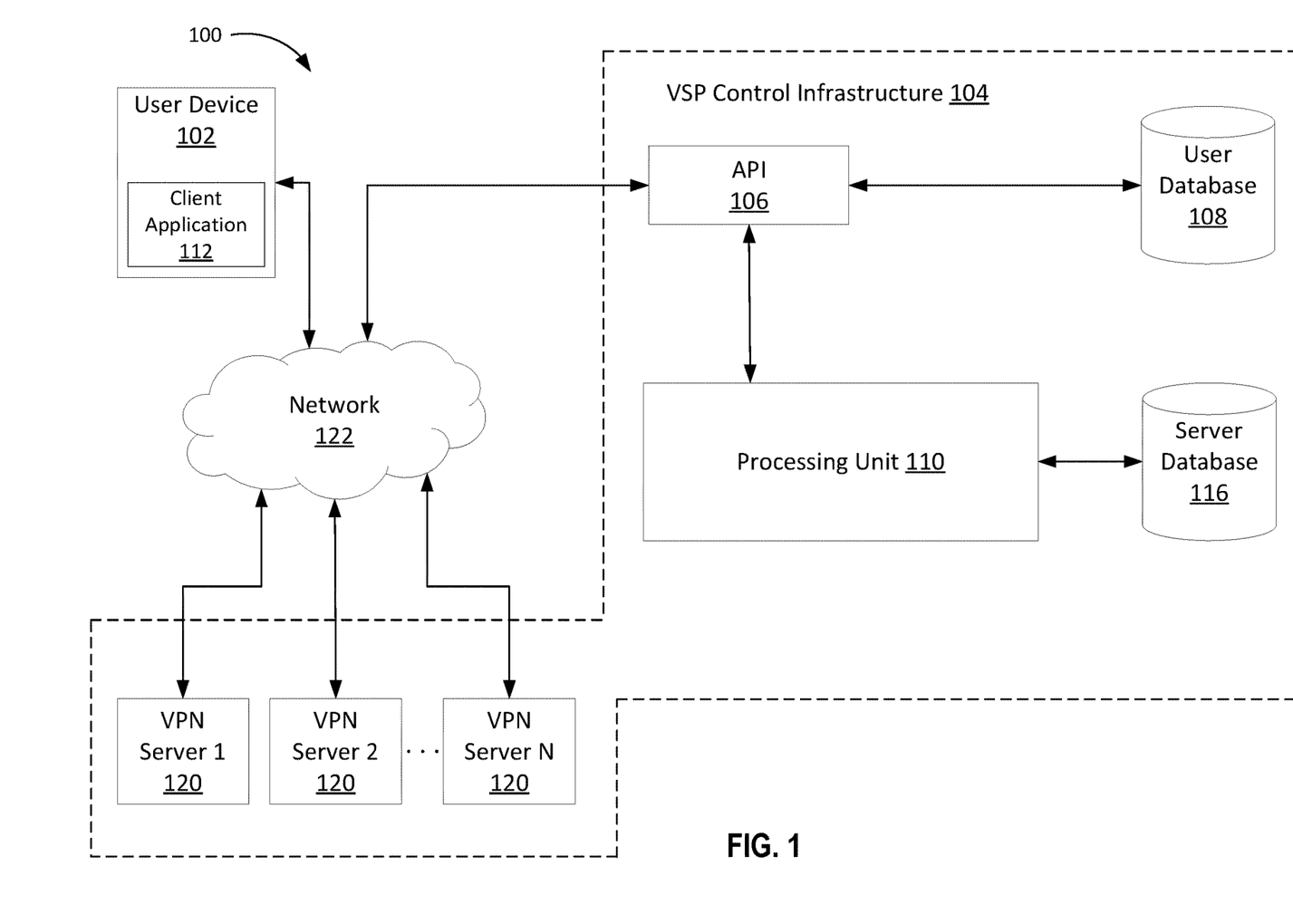
FIG. 1 is an illustration of an example system associated with optimized server picking in a VPN, according to various aspects of the present disclosure.

FIG. 1 is an illustration of an example system 100 associated with server picking in a VPN, according to various aspects of the present disclosure. FIG. 1 shows an example architectural depiction of components included in system 100 (e.g., service environment). In some aspects, the components may include a user device 102 capable of communicating with one or more VPN servers 120 and with a VPN service provider (VSP) infrastructure 104 over a network 122. The VSP control infrastructure 104 may be controlled by a VPN service provider and may include an application programming interface (API) 106, a user database 108, a processing unit 110 including a scoring engine and a testing module (not shown), and a server database 116. As shown in FIG. 1, the API 106 may be capable of communicating with the user database 108 and with the processing unit 110. Additionally, the processing unit 110 may be capable of communicating with the server database, which may be capable of communicating with the testing module 118. The testing module 118 may be capable of communicating with the one or more VPN servers 120 over the network 122.

The user device 102 may be a physical computing device capable of hosting a VPN application and of connecting to the network 122. The user device 102 may be, for example, a laptop, a mobile phone, a tablet computer, a desktop computer, a smart device, a router, or the like. In some aspects, the user device 102 may include, for example, Internet-of-Things (IoT) devices such as VSP smart home appliances, smart home security systems, autonomous vehicles, smart health monitors, smart factory equipment, wireless inventory trackers, biometric cyber security scanners, or the like. The network 122 may be any digital telecommunication network that permits several nodes to share and access resources. In some aspects, the network 122 may include one or more of, for example, a local-area network (LAN), a wide-area network (WAN), a campus-area network (CAN), a metropolitan-area network (MAN), a home-area network (HAN), Internet, Intranet, Extranet, and Internetwork.

The VSP control infrastructure 104 may include a combination of hardware and software components that enable provision of VPN services, including server picking, to the user device 102. The VSP control infrastructure 104 may interface with (the VPN application on) the user device 102 via the API 106, which may include one or more endpoints to a defined request-response message system. In some aspects, the API 106 may be configured to receive, via the network 122, a connection request from the user device 102 to establish a VPN connection with a VPN server 120. The connection request may include an authentication request to authenticate the user device 102 and/or a request for an IP address of an optimal VPN server for establishment of the VPN connection therewith. In some aspects, an optimal VPN server may be a single VPN server 120 or a combination of one or more VPN servers 120. The API 106 may receive the authentication request and the request for an IP address of an optimal VPN server in a single connection request. In some aspects, the API 106 may receive the authentication request and the request for an IP address of an optimal VPN server in separate connection requests.

The API 106 may further be configured to handle the connection request by mediating the authentication request. For instance, the API 106 may receive from the user device 102 credentials including, for example, a unique combination of a user ID and password for purposes of authenticating the user device 102. The API 106 may provide the received credentials to the user database 108 for verification.

The user database 108 may include a structured repository of valid credentials belonging to authentic users. In one example, the structured repository may include one or more tables containing valid unique combinations of user IDs and passwords belonging to authentic users. The VPN service provider may add or delete such valid unique combinations of user IDs and passwords from the structured repository at any time. Based at least in part on receiving the credentials from the API 106, the user database 108 and an associated processor (e.g., a local processor or a remote processor) may verify the received credentials by matching the received credentials with the valid credentials stored in the structured repository. In some aspects, the API 106 along with the user database 108 and the processor may authenticate the user device 102 when the received credentials match at least one of the valid credentials. In this case, the VPN service provider may provide VPN services to the user device 102. When the received credentials fail to match at least one of the valid credentials, the user database 108 and the processor may fail to authenticate the user device 102. In this case, the VPN service provider may decline to provide VPN services to the user device 102.

When the user device 102 is authenticated, the user device 102 may initiate a VPN connection and may transmit to the API 106 may a request for an IP address of an optimal VPN server. The processing unit 110 included in the VSP control infrastructure may be configured to determine/identify a single VPN server 120 as the optimal server or a list of VPN servers. The processing unit 110 may utilize the API 106 to transmit the IP address of the optimal server or IP addresses of the VPN servers 120 included in the list to the user device 102. In the case where the list of IP addresses of the VPN servers 120 is provided, the user device 102 may have an option to select a single VPN server 120 from among the listed VPN servers as the optimal server 120. The user device 102 may establish an encrypted tunnel with the optimal VPN server. In some aspects, a VPN server 120 may be a piece of physical or virtual computer hardware and/or software capable of securely communicating with (the VPN application on) the user device 102 for provision of VPN services.

The processing unit 110 may be a logical unit including the scoring engine. The processing unit 110 may further include a logical component configured to perform complex operations to compute numerical weights related to various factors associated with the VPN servers 120. The scoring engine may likewise include a logical component configured to perform arithmetical and logical operations to compute a server penalty score for one or more of the VPN servers 120. In some aspects, a server penalty score may be a numerical indicator of a quality and/or a condition of a VPN server 120.

To calculate the server penalty score, the processing unit 110 may utilize server information. In some aspects, the server information may be stored, for example, in the server database 116. The server database 116 (and the user database 108) may be a conventional database offered by MySQL, MSSQL, NoSQL, or an object-oriented database, or any other type or category of a database. The server database 116 (and the user database 108) may include a memory or may be included within a memory of a computing device or within a cloud environment.

The server information may include information regarding a plurality of factors and/or conditions associated with the VPN servers 120. Such server information may be collected by the testing module by communicating with the plurality of VPN servers 120 via the network 122. In some aspects, the testing module may be capable of querying the plurality of VPN servers 120 to collect the server information. For instance, the testing module may be configured to monitor and measure a network load of one or more VPN servers 120 periodically or aperiodically, and to store such server information in the server database 116. All or part of the server information populated into the server database 116 may be utilized by the processing unit 110 to calculate server penalty scores.

The processing unit 110 may determine the optimal VPN server based at least in part on the server penalty scores for the VPN servers 120. In one example, the processing unit 110 may determine the VPN server 120 with the lowest server penalty score as the optimal VPN server. In another example, the processing unit 110 may determine the list of optimal VPN servers by including, for example, three (or any other number) VPN servers 120 with the three lowest server penalty scores.

One or more components (e.g., API 106, user database 108, processing unit 110, server database 116, and/or testing module 118) included in the VSP control infrastructure 104 may further include a controller/processor, a memory, or a combination thereof. Alternatively, in some aspects, the one or more components of the set of components may be implemented within a controller/processor, a memory, or a combination thereof. In some aspects, one or more of the components included in the VSP control infrastructure 104 may be separate and distinct from each other. Alternatively, in some aspects, one or more of the components included in the VSP control infrastructure 104 may be combined with one or more of other components included in the VSP control infrastructure 104. In some aspects, one or more of the components included in the VSP control infrastructure 104 may be local with respect to each other. Alternatively, in some aspects, one or more of the components included in the VSP control infrastructure 104 may be located remotely with respect to one or more of other components included in the VSP control infrastructure 104. Additionally, or alternatively, one or more components of the components included in the VSP control infrastructure 104 may be implemented at least in part as software stored in a memory. For example, a component (or a portion of a component) may be implemented as instructions or code stored in a non-transitory computer-readable medium and executable by a controller or a processor to perform the functions or operations of the component. Additionally, or alternatively, a set of (one or more) components shown in FIG. 1 may perform one or more functions described as being performed by another set of components shown in FIG. 1.

As indicated above, FIG. 1 is provided as an example. Other examples may differ from what is described with regard to FIG. 1.

A user device may request VPN services from a VSP control infrastructure. To request the VPN services, the user device may transmit a connection request and/or an authentication request to an API associated with the VSP control infrastructure. Thereafter, the user device may undergo an authentication process involving the API and a database associated with the VSP control infrastructure. Once authenticated, a processing unit associated with the VSP control infrastructure may determine an optimal VPN server for providing the VPN services to the user device.

The processing unit may consider a plurality of factors to determine a VPN server as the optimal VPN server. Such plurality of factors may include qualities and/or conditions associated with the VPN server such as a geolocation of the VPN server, a current network load associated with the VPN server, a proximity of the VPN server to an international Internet exchange hub (e.g., hub score), a random value, or the like.

The geolocation of the VPN server may be associated with a geographical location (e.g., building, town, city, state, country, continent, etc.) within which the VPN server is located. The processing unit may consider a VPN server that is located geographically closer to the user device more suitable for providing the VPN services to the user device as compared to a VPN server that is located geographically farther away from the user device. This may be because the geographically closer VPN server is more likely to enable a robust connection and a higher network speed with respect to the VPN server that is geographically farther away. The smaller the distance of the VPN server from the user device, the less distance the IP packets have to travel over the network, thereby facilitating higher network speed.

A current network load associated with the VPN server may indicate an amount of available bandwidth of the VPN server to provide VPN services to the user device. The amount of available bandwidth may be correlated to, for example, a number of user devices currently being serviced by the VPN server. The processing unit may consider a VPN server that has a larger amount of available bandwidth more suitable for providing the VPN services to the user device as compared to a VPN server that has a smaller amount of available bandwidth. This may be because the VPN server having the larger amount of available bandwidth may have more available resources (e.g., processing power, memory, or the like) to be able to provide a larger amount of VPN services to the user device as compared to the VPN server having the smaller amount of available bandwidth and fewer available resources. For similar reasons, the VPN server having the larger amount of available bandwidth may be able to provide the VPN services with higher network speeds as compared to the VPN server having the smaller amount of available bandwidth.

A proximity of the VPN server to an international Internet exchange hub (IIEH) may be associated with a geographical closeness of the VPN server to the IIEH. The processing unit may consider a VPN server that is located geographically closer to the IIEH more suitable for providing the VPN services to the user device as compared to a VPN server that is located geographically farther away from the IIEH. This may be because the geographically closer VPN server is more likely to enable a robust connection and a higher network speed with respect to the geographically farther away VPN server. The smaller the distance of the VPN server from the IIEH, the better the connection quality and the faster the connection, thereby facilitating higher network speed.

Based on a combination of the above (and other) factors, the processing unit may determine the optimal VPN server or the list of VPN servers. The processing unit may transmit information (e.g., entry IP addresses) associated with the optimal VPN server or the list of VPN servers to the user device. The user device may establish a VPN connection with an optimal VPN server (e.g., the optimal server determined by the processing unit or a VPN server from the list of VPN servers) to obtain the VPN services.

After establishing the VPN connection with the optimal VPN server, the user device may fail to receive the VPN services due to, for example, the VPN services being unavailable in the geolocation of the VPN server. For instance, the optimal VPN server may be limited to providing VPN services available in the geolocation of the optimal VPN server. The user device may establish the VPN connection to receive desired content (e.g., audio, video, information, etc.), and the desired content may be unavailable in the geolocation of the optimal VPN server. In an example, a content provider of the desired content may decline to provide the desired content to the optimal VPN server based on evaluating an exit IP address utilized by the optimal VPN server to obtain the desired content, and determining that the optimal VPN server is located in a geographical location where the desired content is unavailable. As a result, the optimal VPN server may be unable to provide the desired content to the user device.

In another example, the user device may be located in a first geographical location (e.g., Sweden) and may wish to utilize a secure tunnel to privately and/or anonymously communicate sensitive information (e.g., Australian bank account information, etc.) with a target server located in a second geographical location (e.g., Australia). The processing unit may determine a VPN server also located in the first geographical location (e.g., a VPN server that is located geographically closer to the user device) as the optimal VPN server. Nonetheless, it may be crucial that the optimal VPN server be located in the second geographical location, closer to the target server, to enable private and/or anonymous communication of the sensitive information. With the optimal VPN server being located in the first geographical location, the communication of sensitive information with the target server may be more susceptible to becoming compromised. For instance, with the optimal VPN server 120 being located in the first geographical location, the sensitive information may be securely communicated via a secure tunnel (e.g., the established VPN connection) over a shorter distance between the user device 102 in the first geographical location (e.g., Sweden) and the optimal VPN server 120 in the first geographical location (e.g., Sweden), and over the open internet over a longer distance between the optimal VPN server 120 in the first geographical location (e.g., Sweden) and the target server in the second geographical location (e.g., Australia) As a result, the user device may be unable to privately and/or anonymously communicate the sensitive information with the target server.

Because the user device may fail to receive the VPN services from the optimal VPN server, the user device may have to disconnect the established VPN connection with the optimal VPN server and re-establish a new VPN connection with a more suitable VPN server. Such disconnecting of the established VPN connection and establishing of the new VPN connection may inefficiently consume user device resources (e.g., processing resources, memory resources, power consumption resources, battery life, or the like) and resources associated with the VPN (computational resources, network bandwidth, management resources, processing resources, memory resources, or the like) that can otherwise be used to perform suitable tasks associated with the VPN. Additionally, a delay may be introduced in providing the VPN services to the user device.

Various aspects of systems and techniques discussed in the present disclosure enable optimized server picking in a VPN. In some aspects, the techniques enable a processing unit to receive service information from a user device prior to determining an optimal VPN server for providing VPN services to the user device. In some aspects, the processing unit may receive the service information in or along with a connection request from the user device. The service information may indicate a nature of one or more VPN services to be received by the user device during an established VPN connection, and the processing unit may determine the optimal VPN server based at least in part on the service information. In some aspects, the processing unit may determine a VPN server that is capable of providing the one or more VPN services as the optimal VPN server. In an example, the processing unit may determine a VPN server capable of providing the user device with desired content as the optimal VPN server. In another example, the processing unit may determine a VPN server capable of enabling the user device to privately and/or anonymously communicate sensitive information as the optimal VPN server. In this way, a VSP control infrastructure may increase a likelihood of the user device receiving the one or more VPN services after establishing a VPN connection with the optimal VPN server. This may enable the user device and the optimal VPN server to avoid disconnecting an established VPN connection and re-establishing a new VPN connection, thereby enabling conservation and efficient utilization of user device resources (e.g., processing resources, memory resources, power consumption resources, battery life, or the like) and resources associated with the VPN (computational resources, network bandwidth, management resources, processing resources, memory resources, or the like) for more suitable tasks associated with the VPN. Further, a delay in providing the one or more VPN services to the user device may be avoided.

In some aspects, a processor (e.g., processing unit) associated with the VSP control infrastructure may receive, from a user device, a connection request to establish a VPN connection, the connection request including service information associated with one or more VPN services to be obtained during the VPN connection; select, based at least in part on the service information, a given VPN server for the VPN connection; and transmit, to the user device, information associated with the given VPN server to allow the user device to establish the VPN connection with the given VPN server.

Figure 2:
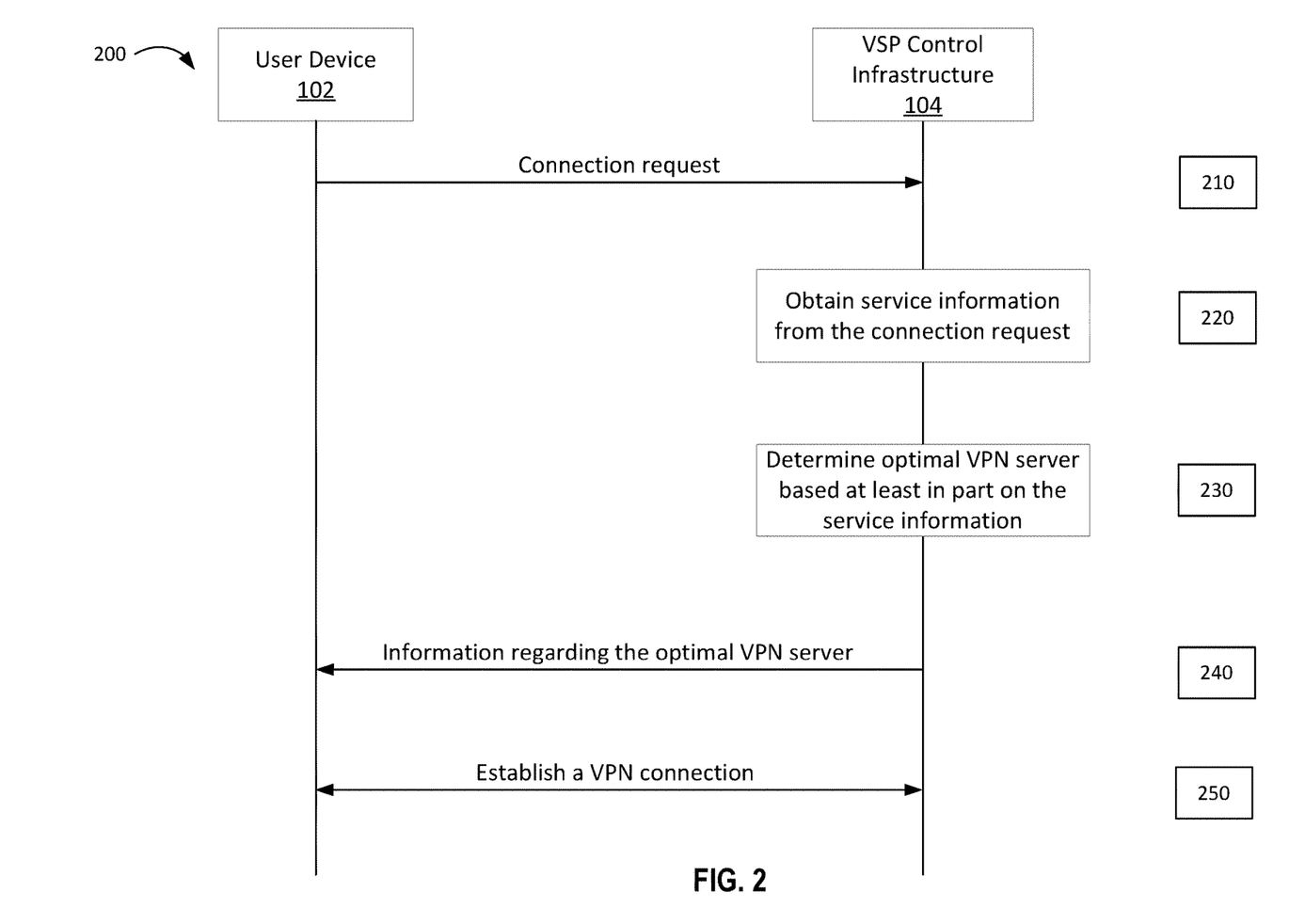
FIG. 2 is an illustration of an example flow associated with optimized server picking in a VPN, according to various aspects of the present disclosure.

FIG. 2 is an illustration of an example flow associated with server picking in a VPN, according to various aspects of the present disclosure. FIG. 2 shows a user device 102 in communication with a VSP control infrastructure 104. In some aspects, the requesting user device 102 may communicate with the VSP control infrastructure 104 over a network (e.g., network 122). In some aspects, the requesting user device 102 may utilize an installed client application 112 to communicate with an API (e.g., API 106) associated with the VSP control infrastructure 104.

As shown by reference numeral 210, the requesting user device 102 may transmit a connection request to the VSP control infrastructure 104 for purposes of establishing a VPN connection with a VPN server 120 associated with the VSP control infrastructure 104 and receiving a VPN service. The connection request may include a request for information (e.g., IP address) associated with the VPN server 120. In some aspects, the connection request may include service information that indicates a nature of the VPN service to be received during the established VPN connection. In some aspects, the user device 102 may transmit the service information in a separate communication at substantially the same time as the connection request.

In some aspects, the VSP control infrastructure 104 may provide the client application 112 to be installed on the user device 102. The client application 112 may enable the user device 102 to receive service information and to transmit the connection request and the service information to the VSP control infrastructure 104. The client application 112 may include a graphical interface to receive service information via a local input interface (e.g., touch screen, keyboard, mouse, pointer, etc.) associated with the user device 102.

The service information may be received via text input or via a selection from among a plurality of options (e.g., pull down menu, etc.). In some aspects, the client application 112 may activate and/or enable, at a time associated with transmitting the connection request, the graphical interface for receiving the service information. For instance, the client application 112 may cause a screen (e.g., local screen) associated with the user device 102 to display, for example, a pop-up message to request entry of the service information before or at a time of transmitting the connection request. Further, the client application 112 may enable transmission of the service information to the VSP control infrastructure 104 in association with the connection request. In one example, the client application 112 may enable the service information to be included within the connection request or may enable transmission of the service information in a separate communicate at substantially the same time as transmission of the connection request. In this way, the client application 112 enables the VSP control infrastructure 104 to receive service information prior to establishment of the VPN connection so that the VSP control infrastructure 104 may make a more informed determination regarding an optimal VPN server.

As shown by reference numeral 220, the VSP control infrastructure 104 may receive the service information in the connection request or via the separate communication. The service information may indicate a VPN service that the user device 102 may receive during an established VPN connection. In an example, the service information may indicate that the user device 102, while being located in a first geographical location, may receive desired content available in a second geographical location (and unavailable in the first geographical location). Based at least in part on receiving the service information, as shown by reference numeral 230, a processor (e.g., processing unit 110 and/or processor 520, etc.) associated with the VSP control infrastructure 104 may determine a VPN server 120 (or a list of VPN servers 120) that is capable of providing the desired content to the user device as an optimal VPN server 120. The processor may determine that the VPN server 120 is capable of providing the desired content based at least in part on a location of the VPN server 120. For instance, the optimal VPN server 120 may be located in the second geographical location and, therefore, able to obtain and provide the desired content to the user device 102. In some aspects, the optimal VPN server 120 may be located in the first geographical location or in a geographical location other than the first geographical location and the second geographical location, and may be able to obtain and provide the desired content to the user device 102. For instance, the optimal VPN server 120 may be able to reach a domain name services (DNS) server capable of providing the optimal VPN server 120 with access to an exchange point located in the second geographical location through which the optimal VPN server 120 may obtain and provide the desired content to the user device 102.

In another example, the service information may indicate that the user device, while being located in a first geographical location (e.g., Sweden), may utilize a secure tunnel with a VPN server to privately and/or anonymously communicate sensitive information (e.g., Australian bank account information, etc.) with a target server located in a second geographical location (e.g., Australia). In some aspects, the user device 102 may be native to the second geographical location and may be temporarily located in the first geographical location. Based at least in part on receiving the service information, as shown by reference numeral 230, the processor may determine a VPN server also located in the second geographical location (e.g., a VPN server that is located geographically closer to the target server) as the optimal VPN server. With the optimal VPN server being located in the second geographical location, the user device 102 may privately and/or anonymously communicate the sensitive information with the target server with the sensitive information being less susceptible to becoming compromised. For instance, with the optimal VPN server 120 being located in the second geographical location, the sensitive information may be securely communicated via a secure tunnel (e.g., the established VPN connection) over a longer distance between the user device 102 in the first geographical location (e.g., Sweden) and the optimal VPN server 120 in the second geographical location (e.g., Australia), and over the open internet over a shorter distance between the optimal VPN server 120 in the second geographical location (e.g., Australia) and the target server in the second geographical location (e.g., Australia). As a result, the user device may privately and/or anonymously communicate the sensitive information with the target server.

In some aspects, the service information may include information associated with the user device 102 (e.g., user device information) containing parameters such as, for example, acceptance of the terms of services, device type and model, operating system type and version, identification (e.g., an e-mail address), frequency, intervals, and schedule at which static parameters such as geolocation and/or IP type are changed, time seen, session duration and timestamps, timestamps of being in idle state, current total traffic (e.g., bandwidth utilization), traffic per day or other period of time, response time, latency, target, battery life, etc. The user device information may also include aggregated parameters (e.g., average speed, average session duration and timestamps, average traffic, average response time, average latency, variations in which median and percentile groups are used instead of average values, etc.) over a given period of any duration of time in any combination and with weights that assign a priority to the parameters.

In some aspects, the service information may include condition information indicating conditions associated with the user device 102 during the established VPN connection. Such condition information may indicate a static condition and/or a dynamic condition associated with the user device 102. A static condition may include, for example, a type of network connection utilized by the user device 102, a type of operating system utilized by the user device 102, or the like. In some aspects, the type of network connection may include, for example, a fluctuating connection, or a stable connection, etc. The fluctuating connection may include the user device 102 connecting to a network (e.g., network 122) via mobile technology (e.g., Code Division Multiple Access (CDMA), Global System for Mobiles (GSM), or the like). The stable connection may include the user device 102 connecting to a network (e.g., network 122) via immobile technology (e.g., ethernet connection, WiFi connection, or the like).

In an example, the VSP control infrastructure may determine the optimal VPN server 120 based at least in part on the type of connection. For instance, when the VSP control infrastructure 104 determines that the user device 102 may utilize a fluctuating connection to communicate with a VPN server during the established VPN connection, the VSP control infrastructure may determine that the user device 102 may communicate (e.g., transmit and/or receive) utilizing small IP packets associated with a packet size that satisfies a threshold packet size (e.g., packet size is smaller than or equal to the threshold packet size). Based at least in part on determining that the user device 102 may utilize a fluctuating connection, the VSP control infrastructure may determine a VPN server having a network stack capable of processing small IP packets as the optimal VPN server 120. Similarly, when the VSP control infrastructure 104 determines that the user device 102 may utilize a stable connection to communicate with a VPN server during the established VPN connection, the VSP control infrastructure may determine that the user device 102 may communicate (e.g., transmit and/or receive) utilizing large IP packets associated with a packet size that fails to satisfy the threshold packet size (e.g., packet size is larger than the threshold packet size) as the optimal VPN server 120. Based at least in part on determining that the user device 102 may utilize a stable connection, the VSP control infrastructure may determine a VPN server having a network stack capable of processing large IP packets as the optimal VPN server.

Additionally, or alternatively, the VSP control infrastructure may determine the optimal VPN server 120 based at least in part on the type of operating system. In some aspects, the type of operating system may include, for example, an iOS operating system, an Android operating system, a Windows operating system, or the like. In an example, when the VSP control infrastructure 104 determines that the user device 102 may operate utilizing a first type of operating system while communicating with a VPN server during the established VPN connection, the VSP control infrastructure may determine a VPN server optimized to provide VPN services associated with the first type of operating system as the optimal VPN server 120. For instance, based at least in part on determining that the user device 102 may utilize, for example, the iOS operating system, the VSP control infrastructure may determine that the user device 102 may receive VPN services designed and/or customized to be utilized by devices that operate utilizing the iOS operating system, and may determine the optimal VPN server 120 accordingly. In some aspects, the VSP control infrastructure may determine a VPN server that is located closer to an iOS server as the optimal VPN server. Similarly, when the VSP control infrastructure 104 determines that the user device 102 may operate utilizing a second type of operating system while communicating with a VPN server during the established VPN connection, the VSP control infrastructure may determine a VPN server optimized to provide VPN services associated with the second type of operating system as the optimal VPN server 120. For instance, based at least in part on determining that the user device 102 may utilize, for example, the Android operating system, the VSP control infrastructure may determine that the user device 102 may receive VPN services designed and/or customized to be utilized by devices that operate utilizing the Android operating system, and may determine the optimal VPN server 120 accordingly. In some aspects, the VSP control infrastructure may determine a VPN server that is located closer to an Android server as the optimal VPN server 120.

The VSP infrastructure may also factor one or more dynamic conditions while determining the optimal VPN server. A dynamic condition associated with the user device 102 may include, for example, a speed of a network connection utilized by the user device 102 during the established VPN connection, or the like. For instance, when the VSP control infrastructure 104 determines that the speed of the network connection during the established VPN connection fails to satisfy a threshold network speed (e.g., speed of network connection is greater than or equal to the threshold network speed), the VSP control infrastructure may determine a VPN server having adequate available bandwidth to handle the speed of network connection that fails to satisfy the threshold network speed as the optimal VPN server 120. Similarly, when the VSP control infrastructure 104 determines that the speed of the network connection during the established VPN connection satisfies the threshold network speed (e.g., speed of network connection is less than the threshold network speed), the VSP control infrastructure may determine a VPN server having adequate available bandwidth to handle the speed of network connection that satisfies the threshold network speed as the optimal VPN server 120.

The dynamic condition may also indicate one or more preferences of the user device 102 to utilize a VPN server that is optimized for particular tasks such as, for example, streaming multimedia content. In some aspects, the one or more preferences of the user device 102 may indicate that the user device 102 may receive the VPN service utilizing a multihop VPN server. In some aspects, the one or more preferences may indicate a specific geographical location in which the VPN server is to be located or a specific geographical location in which the VPN server is not to be located. For instance, the one or more preferences may indicate that the VPN server is to be located in, for example, the United States of America or that the VPN server is not to be located in, for example, the country in which the user device is located. In some aspects, the one or more preferences may indicate a VPN server based at least in part on an available amount of bandwidth. For instance, the one or more preferences may indicate that the VPN server should have a threshold amount of available bandwidth (e.g., 90%). In some aspects, the user device may indicate a combination of a plurality of the one or more preferences. The VSP infrastructure may factor the combination of the plurality of the one or more preferences of the user device 102 while determining the optimal VPN server.

In some aspects, the VSP infrastructure may factor any combination of the pieces of information received in the service information (e.g., indicated VPN service, user device information, condition information, static condition, dynamic condition, one or more preferences, etc.). For instance, the VSP infrastructure may factor a combination of a preference of the user device 102 and user device information to determine the optimal VPN server. In an example, based at least in part on the preference of the user device 102 and user device information, the VSP control infrastructure may determine a subset of the plurality of VPN servers 120 as potential candidates for the optimal VPN server. Further, the VSP control infrastructure may determine the optimal VPN server from the subset of the plurality of VPN servers 120 and/or a list of optimal VPN servers from the subset of the plurality of VPN servers 120 based at least in part on a geolocation of the subset of the plurality of VPN serves 120, a current network load associated with the subset of the plurality of VPN serves 120, a proximity of the subset of the plurality of VPN serves 120 to an international Internet exchange hub (e.g., hub score), a random value, or the like.

Based at least in part on determining the optimal VPN server 120, as shown by reference numeral 240, the VSP control infrastructure 104 may transmit information regarding the optimal VPN server 120 to the user device 102. In some aspects, the information may include an entry IP address associated with the optimal VPN server 120. The user device 102 may utilize the entry IP address to access and establish a VPN connection with the optimal VPN server 120. In this way, the VSP control infrastructure 104 may enable the user device 102 to allow the user device 102 to establish the VPN connection with the optimal VPN server 120. As shown by reference numeral 250, the optimal VPN server 120 and the user device 102 may establish a VPN connection during which the VPN server 120 may provide the VPN service to the user device 102.

By utilizing the above systems and techniques associated with optimized server picking in a VPN, a client application 112 may enable a VSP control infrastructure to receive service information prior to establishment of a VPN connection so that the VSP control infrastructure may make a more informed determination regarding an optimal VPN server. In this way, the VSP control infrastructure may increase a likelihood of the user device receiving the one or more VPN services after establishing a VPN connection with the optimal VPN server. As a result, the user device and the VSP control infrastructure may avoid expending resources to disconnect an established VPN connection and to re-establish a new VPN connection, thereby enabling conservation and efficient utilization of user device resources (e.g., processing resources, memory resources, power consumption resources, battery life, or the like) and resources associated with the VPN (computational resources, network bandwidth, management resources, processing resources, memory resources, or the like) for more suitable tasks associated with the VPN. Additionally, a delay in providing the one or more VPN services to the user device may be avoided.

As indicated above, FIG. 2 is provided as an example. Other examples may differ from what is described with regard to FIG. 2.

Figure 3:
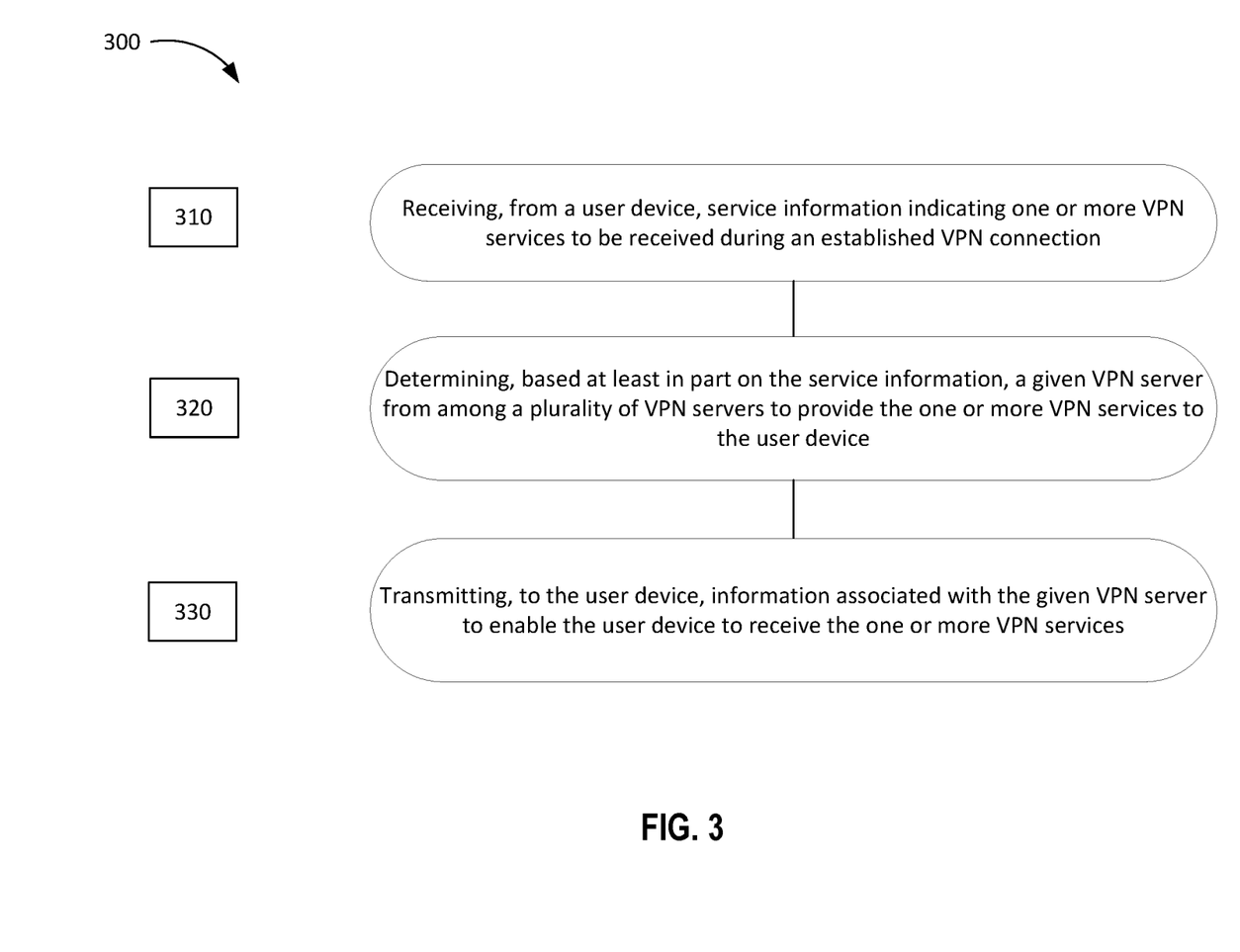
FIG. 3 is an illustration of an example process associated with optimized server picking in a VPN, according to various aspects of the present disclosure.

FIG. 3 is an illustration of an example process 300 associated with optimized server picking in a VPN, according to various aspects of the present disclosure. In some aspects, the process 300 may be performed by a processor/controller (e.g., processing unit 110 and/or processor 520) associated with a VSP control infrastructure (e.g., VSP control infrastructure 104). As shown by reference numeral 310, process 300 includes receiving, from a user device, a connection request to establish a VPN connection, the connection request including service information associated with one or more VPN services to be obtained during the VPN connection. For instance, the VSP control infrastructure may utilize the associated processor/controller to receive, from a user device, a connection request to establish a VPN connection, the connection request including service information associated with one or more VPN services to be obtained during the VPN connection, as discussed elsewhere herein.

As shown by reference numeral 320, process 300 includes determining, based at least in part on the service information, a given VPN server from among a plurality of VPN servers to provide the one or more VPN services to the user device. For instance, the VSP control infrastructure may utilize the associated processor/controller to determine, based at least in part on the service information, a given VPN server from among a plurality of VPN servers to provide the one or more VPN services to the user device, as discussed elsewhere herein.

As shown by reference numeral 330, process 300 includes transmitting, to the requesting user device, information associated with the given VPN server to enable the user device to receive the one or more VPN services. For instance, the VSP control infrastructure may utilize a communication interface (e.g., communication interface 570) and the associated processor/controller to transmit, to the user device, information associated with the given VPN server to enable the user device to receive the one or more VPN services, as discussed elsewhere herein.

Process 300 may include additional aspects, such as any single aspect or any combination of aspects described below and/or in connection with one or more other processes described elsewhere herein.

In a first aspect, in process 300, receiving the service information includes receiving the service information prior to the VPN connection being established.

In a second aspect, alone or in combination with the first aspect, in process 300, receiving the service information includes receiving the service information in a connection request transmitted by the user device to establish the VPN connection.

In a third aspect, alone or in combination with the first through second aspects, in process 300, the service information indicates a static condition or a dynamic condition to be utilized by the user device during the established VPN connection.

In a fourth aspect, alone or in combination with the first through third aspects, in process 300, determining the given VPN server as the optimal VPN server includes determining the given VPN server as the optimal VPN server based at least in part on an ability of the given VPN server to provide the one or more VPN services.

In a fifth aspect, alone or in combination with the first through fourth aspects, in process 300, determining the given VPN server as the optimal VPN server includes determining the given VPN server as the optimal VPN server based at least in part on a geographical location of the given VPN server.

In a sixth aspect, alone or in combination with the first through fifth aspects, in process 300, the user device is located in a first geographical location and the given VPN server is located in a second geographical location, different from the first geographical location.

Although FIG. 3 shows example blocks of the process, in some aspects, the process may include additional blocks, fewer blocks, different blocks, or differently arranged blocks than those depicted in FIG. 3. Additionally, or alternatively, two or more of the blocks of the process may be performed in parallel.

As indicated above, FIG. 3 is provided as an example. Other examples may differ from what is described with regard to FIG. 3.

Figure 4:
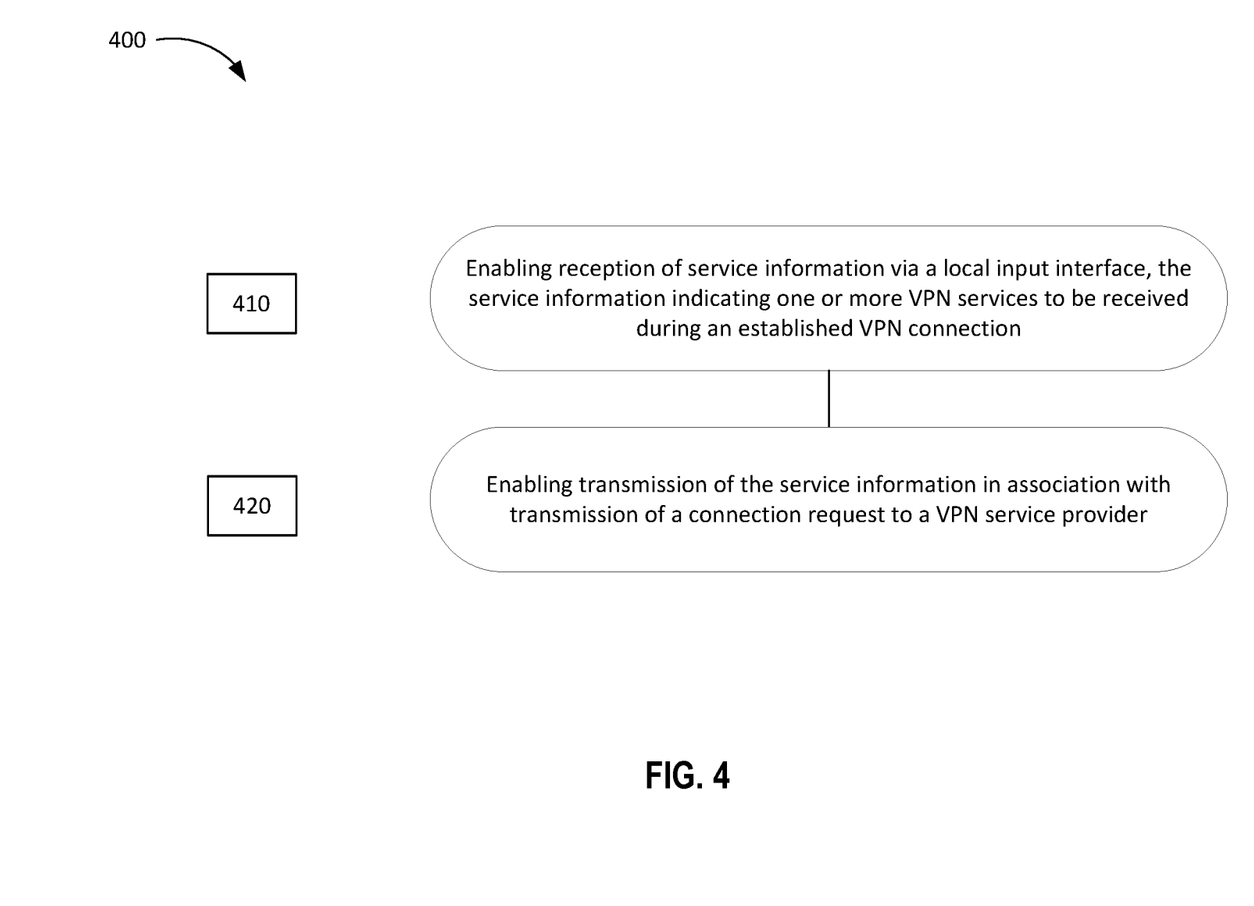
FIG. 4 is an illustration of an example process associated with optimized server picking in a VPN, according to various aspects of the present disclosure.

FIG. 4 is an illustration of an example process 400 associated with optimized server picking in a VPN, according to various aspects of the present disclosure. In some aspects, the process 400 may be enabled by a client application provided by a VSP control infrastructure (e.g., VSP control infrastructure 104) and may be performed by a processor (e.g., processor 620) executing the client application (e.g., client application 112) on a device (e.g., user device 102). As shown by reference numeral 410, process 400 includes enabling reception of service information via a local input interface, the service information indicating one or more VPN services to be received during an established VPN connection. For instance, the processor (e.g., processor 620) may execute the client application to enable reception of service information via a local input interface, the service information indicating one or more VPN services to be received during an established VPN connection, as discussed elsewhere herein.

As shown by reference numeral 420, process 400 includes enabling transmission of the service information in association with transmission of a connection request to a VPN service provider. For instance, the processor (e.g., processor 620) may execute the client application to enable transmission of the service information in association with transmission of a connection request to a VPN service provider, as discussed elsewhere herein.

Process 400 may include additional aspects, such as any single aspect or any combination of aspects described below and/or in connection with one or more other processes described elsewhere herein.

In a first aspect, in process 400, enabling reception of the service information includes enabling reception of the service information via a local input interface.

In a second aspect, alone or in combination with the first aspect, in process 400, enabling reception of the service information includes enabling reception of the service information via text or via a selection from a plurality of options.

In a third aspect, alone or in combination with the first through second aspects, process 400 includes enabling transmission of the connection request to the VPN service provider, the connection request including the service information.

In a fourth aspect, alone or in combination with the first through third aspects, process 400 includes enabling display, on a local screen, of a request message to request entry of the service information.

In a fifth aspect, alone or in combination with the first through fourth aspects, process 400 includes enabling display, at a time associated with transmission of the connection request, of a request message to request entry of the service information.

In a sixth aspect, alone or in combination with the first through fifth aspects, process 400 includes enabling display, before transmission of the connection request, of a request message to request entry of the service information.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

Figure 5:
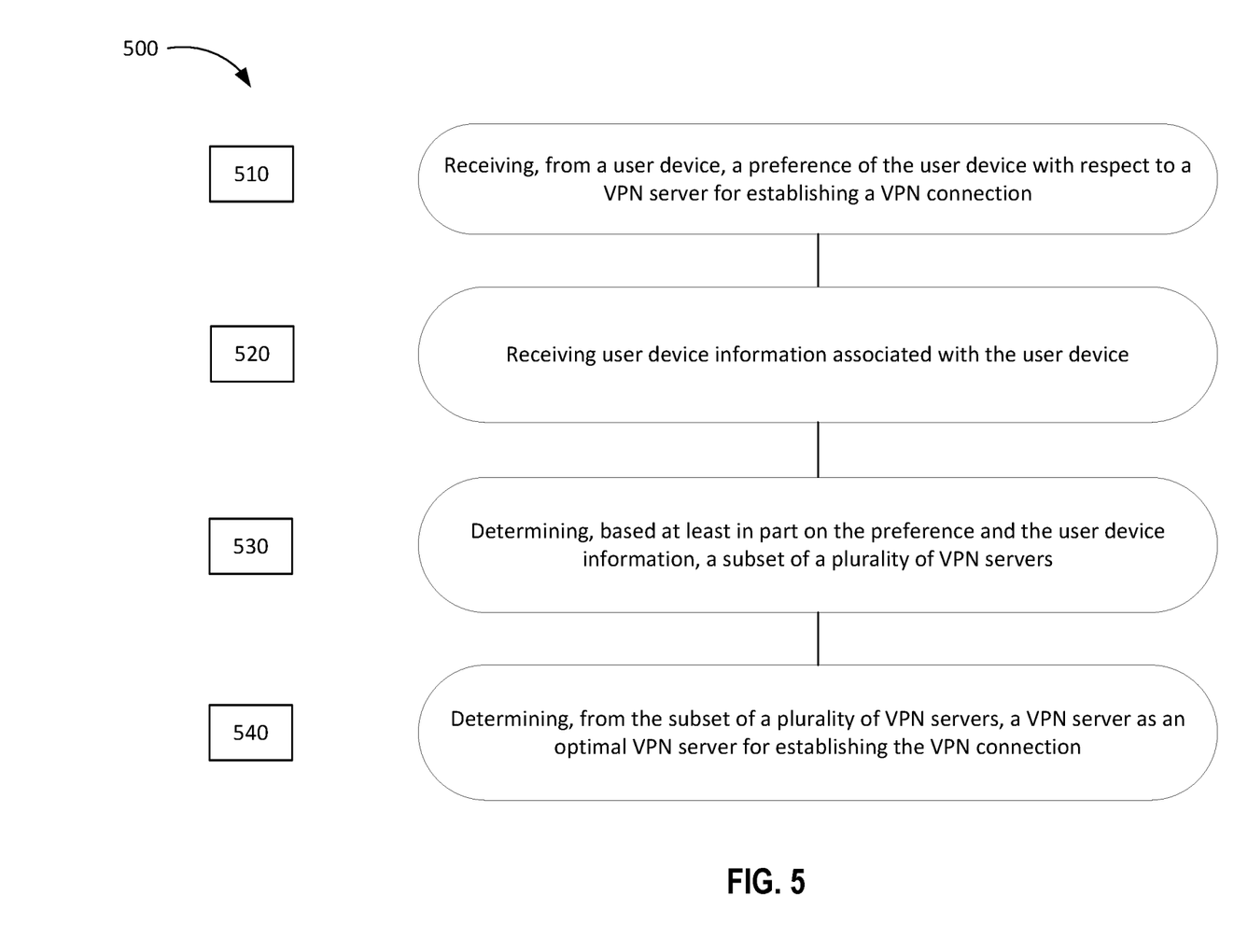
FIG. 5 is an illustration of an example process associated with optimized server picking in a VPN, according to various aspects of the present disclosure.

FIG. 5 is an illustration of an example process 500 associated with optimized server picking in a VPN, according to various aspects of the present disclosure. In some aspects, the process 500 may involve a processor (e.g., processing unit 110, processor 620) associated with a VSP control infrastructure (e.g., VSP control infrastructure 104) and/or a client application provided by the VSP control infrastructure. As shown by reference numeral 510, process 500 includes receiving, from a user device, a preference of the user device with respect to a VPN server for establishing a VPN connection. For instance, the processor may utilize a communication interface (e.g., communication interface 670) to receive, from a user device, a preference of the user device with respect to a VPN server for establishing a VPN connection, as discussed elsewhere herein.

As shown by reference numeral 520, process 500 includes receiving user device information associated with the user device. For instance, the processor may utilize the communication interface to receive user device information associated with the user device, as discussed elsewhere herein.

As shown by reference numeral 530, process 500 includes determining, based at least in part on the preference and the user device information, a subset of a plurality of VPN servers. For instance, the processor may determine, based at least in part on the preference and the user device information, a subset of a plurality of VPN servers, as discussed elsewhere herein.

As shown by reference numeral 540, process 500 includes determining, from the subset of a plurality of VPN servers, a VPN server as an optimal VPN server for establishing the VPN connection. For instance, the processor may determine, from the subset of a plurality of VPN servers, a VPN server as an optimal VPN server for establishing the VPN connection, as discussed elsewhere herein.

Process 500 may include additional aspects, such as any single aspect or any combination of aspects described below and/or in connection with one or more other processes described elsewhere herein.

In a first aspect, in process 500, receiving the preference includes receiving the preference prior to establishing the VPN connection; and receiving the user device information includes receiving the user device information prior to establishing the VPN connection.

In a second aspect, alone or in combination with the first aspect, in process 500, receiving the preference includes receiving the preference in a connection request transmitted by the user device for establishing the VPN connection; and receiving the user device information includes receiving the user device information in the connection request transmitted by the user device for establishing the VPN connection.

In a third aspect, alone or in combination with the first through second aspects, in process 500, determining the VPN server as the optimal VPN server includes determining the VPN server as the optimal VPN server based at least in part on a geographical location of the VPN server.

In a fourth aspect, alone or in combination with the first through third aspects, in process 500, receiving the preference includes receiving the preference indicating a preferred amount of available bandwidth associated with the optimal VPN server.

In a fifth aspect, alone or in combination with the first through fourth aspects, in process 500, receiving the user device information includes receiving aggregated parameters associated with the user device, the aggregated parameters being aggregated over a given period of time.

In a sixth aspect, alone or in combination with the first through fifth aspects, process 500 includes transmitting, to the user device, information regarding the optimal VPN server for establishing the VPN connection.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

Figure 6:
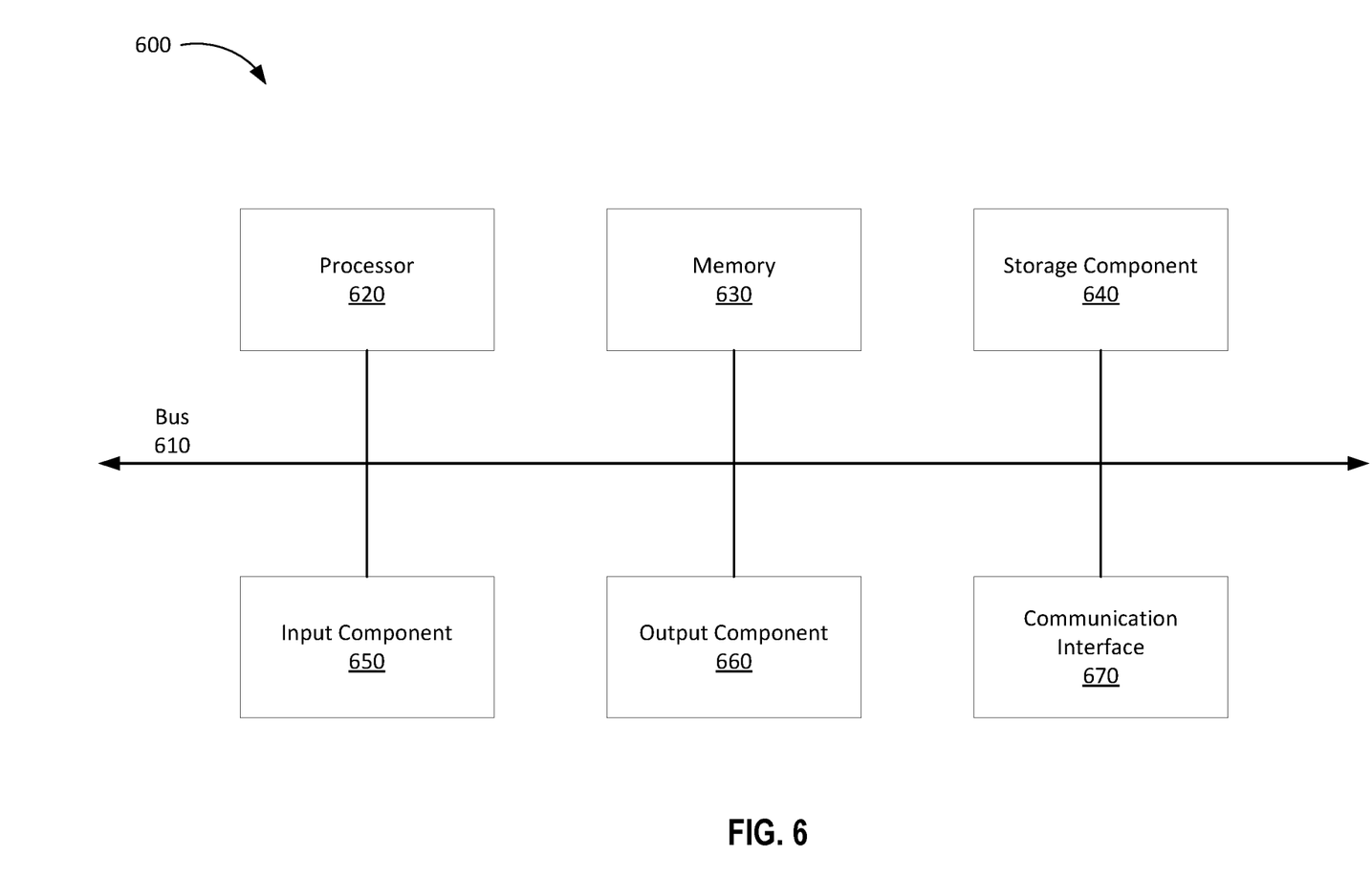
FIG. 6 is an illustration of example devices associated with optimized server picking in a VPN, according to various aspects of the present disclosure.

FIG. 6 is an illustration of example devices 600, according to various aspects of the present disclosure. In some aspects, the example devices 600 may form part of or implement the systems, environments, infrastructures, components, or the like described elsewhere herein (e.g., FIG. 1 and/or FIG. 2) and may be used to perform the processes described herein. The example devices 600 may include a universal bus 610 communicatively coupling a processor 620, a memory 630, a storage component 640, an input component 650, an output component 660, and a communication interface 670.

Bus 610 may include a component that permits communication among multiple components of a device 600. Processor 620 may be implemented in hardware, firmware, and/or a combination of hardware and software. Processor 620 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 620 may include one or more processors capable of being programmed to perform a function. Memory 630 may include a random access memory (RAM), a read only memory (ROM), and/or another type of dynamic or static storage device (e.g., a flash memory, a magnetic memory, and/or an optical memory) that stores information and/or instructions for use by processor 620.

Storage component 640 may store information and/or software related to the operation and use of a device 600. For example, storage component 640 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 650 may include a component that permits a device 600 to receive information, such as via user input (e.g., a touch screen display, a keyboard, a keypad, a mouse, a button, a switch, and/or a microphone). Additionally, or alternatively, input component 650 may include a component for determining location (e.g., a global positioning system (GPS) component) and/or a sensor (e.g., an accelerometer, a gyroscope, an actuator, another type of positional or environmental sensor, and/or the like). Output component 660 may include a component that provides output information from device 600 (via, for example, a display, a speaker, a haptic feedback component, an audio or visual indicator, and/or the like).

Communication interface 670 may include a transceiver-like component (e.g., a transceiver, a separate receiver, a separate transmitter, and/or the like) that enables a device 600 to communicate with other devices, such as via a wired connection, a wireless connection, or a combination of wired and wireless connections. Communication interface 670 may permit device 600 to receive information from another device and/or provide information to another device. For example, communication interface 670 may include an Ethernet interface, an optical interface, a coaxial interface, an infrared interface, a radio frequency (RF) interface, a universal serial bus (USB) interface, a Wi-Fi interface, a cellular network interface, and/or the like.

A device 600 may perform one or more processes described elsewhere herein. A device 600 may perform these processes based on processor 620 executing software instructions stored by a non-transitory computer-readable medium, such as memory 630 and/or storage component 640. As used herein, the term "computer-readable medium" may refer to a non-transitory memory device. A memory device may include memory space within a single physical storage device or memory space spread across multiple physical storage devices.

Software instructions may be read into memory 630 and/or storage component 640 from another computer-readable medium or from another device via communication interface 670. When executed, software instructions stored in memory 630 and/or storage component 640 may cause processor 620 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 6 are provided as an example. In practice, a device 600 may include additional components, fewer components, different components, or differently arranged components than those shown in FIG. 6. Additionally, or alternatively, a set of components (e.g., one or more components) of a device 600 may perform one or more functions described as being performed by another set of components of a device 600.

As indicated above, FIG. 6 is provided as an example. Other examples may differ from what is described with regard to FIG. 6.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    transmitting, by a user device to an infrastructure device prior to establishing a virtual private network (VPN) connection with a VPN server, service information indicating one or more VPN services to be received by the user device after establishing the VPN connection with the VPN server;
    receiving, by the user device from the infrastructure device, information associated with the VPN server that is selected by the infrastructure device to provide the one or more VPN services to the user device based at least in part on the service information; and
    establishing, by the user device based at least in part on utilizing the information associated with the VPN server, the VPN connection with the VPN server to receive the one or more VPN services.

2. The method of claim 1, wherein transmitting the service information includes transmitting the service information in association with a connection request transmitted by the user device to the infrastructure device.

3. The method of claim 1, wherein the service information indicates a static condition or a dynamic condition to be utilized by the user device during the established VPN connection.

4. The method of claim 1, wherein the service information indicates a type of network connection to be utilized by the user device during the established VPN connection.

5. The method of claim 1, wherein the service information indicates a type of operating system utilized by the user device.

6. The method of claim 1, wherein the service information indicates a size of internet protocol (IP) packets to be communicated between the user device and the VPN server during the established VPN connection.

7. The method of claim 1, further comprising:
    transmitting, by the user device to the infrastructure device, a preference of the user device with respect to the VPN server to be selected by the infrastructure device.

8. A user device, comprising:
    a memory; and
    a processor communicatively coupled to the memory, the memory and the processor being configured to:
        transmit, to an infrastructure device prior to establishing a virtual private network (VPN) connection with a VPN server, service information indicating one or more VPN services to be received by the user device after establishing the VPN connection with the VPN server;
        receive, from the infrastructure device, information associated with the VPN server that is selected by the infrastructure device to provide the one or more VPN services to the user device based at least in part on the service information; and
        establish, based at least in part on utilizing the information associated with the VPN server, the VPN connection with the VPN server to receive the one or more VPN services.

9. The user device of claim 8, wherein, to transmit the service information, the memory and the processor are configured to transmit the service information in association with a connection request transmitted by the user device to the infrastructure device.

10. The user device of claim 8, wherein the service information indicates a static condition or a dynamic condition to be utilized by the user device during the established VPN connection.

11. The user device of claim 8, wherein the service information indicates a type of network connection to be utilized by the user device during the established VPN connection.

12. The user device of claim 8, wherein the service information indicates a type of operating system utilized by the user device.

13. The user device of claim 8, wherein the service information indicates a size of internet protocol (IP) packets to be communicated between the user device and the VPN server during the established VPN connection.

14. The user device of claim 8, wherein the memory and the processor are configured to transmit, to the infrastructure device, a preference of the user device with respect to the VPN server to be selected by the infrastructure device.

15. A non-transitory computer-readable medium configured to store instructions, which when executed by a processor associated with a user device, configure the processor to:
    transmit, to an infrastructure device prior to establishing a virtual private network (VPN) connection with a VPN server, service information indicating one or more VPN services to be received by the user device after establishing the VPN connection with the VPN server;
    receive, from the infrastructure device, information associated with the VPN server that is selected by the infrastructure device to provide the one or more VPN services to the user device based at least in part on the service information; and
    establish, based at least in part on utilizing the information associated with the VPN server, the VPN connection with the VPN server to receive the one or more VPN services.

16. The non-transitory computer-readable medium of claim 15, wherein, to transmit the service information, the processor is configured to transmit the service information in association with a connection request transmitted by the user device to the infrastructure device.

17. The non-transitory computer-readable medium of claim 15, wherein the service information indicates a static condition or a dynamic condition to be utilized by the user device during the established VPN connection.

18. The non-transitory computer-readable medium of claim 15, wherein the service information indicates a type of network connection to be utilized by the user device during the established VPN connection.

19. The non-transitory computer-readable medium of claim 15, wherein the service information indicates a type of operating system utilized by the user device.

20. The non-transitory computer-readable medium of claim 15, wherein the service information indicates a size of internet protocol (IP) packets to be (IP) packets to be communicated between the user device and the VPN server during the established VPN connection.

\* \* \* \* \*